US011110983B1

(12) United States Patent
Stark

(10) Patent No.: US 11,110,983 B1
(45) Date of Patent: Sep. 7, 2021

(54) MOTORCYCLE FOOTREST

(71) Applicant: Richard Stark, Houston, TX (US)

(72) Inventor: Richard Stark, Houston, TX (US)

(*) Notice: Subject to any disclaimer, the term of this patent is extended or adjusted under 35 U.S.C. 154(b) by 0 days.

(21) Appl. No.: 16/781,218

(22) Filed: Feb. 4, 2020

(51) Int. Cl.
B62J 25/06 (2020.01)

(52) U.S. Cl.
CPC .................................. B62J 25/06 (2020.02)

(58) Field of Classification Search
CPC ...... B62J 25/06; B62J 25/00; Y10T 74/20918
USPC .................................. 280/291, 163; 74/564
See application file for complete search history.

(56) References Cited

U.S. PATENT DOCUMENTS

| 5,779,254 | A  | * | 7/1998  | James ........................ | B62J 25/00 180/219 |
| 6,945,376 | B1 | * | 9/2005  | Hunter ...................... | B62K 23/08 192/114 R |
| 7,040,442 | B2 | * | 5/2006  | McWhorter ............ | B62K 23/08 180/219 |
| 7,637,523 | B2 | * | 12/2009 | Fouhy ....................... | B62J 25/00 280/291 |
| 8,870,207 | B2 | * | 10/2014 | Parvey ...................... | B62J 25/00 280/166 |
| 9,290,225 | B2 | * | 3/2016  | Gershteyn ................ | B62J 25/00 |

* cited by examiner

Primary Examiner — Minnah L Seoh
Assistant Examiner — Hosam Shabara
(74) Attorney, Agent, or Firm — Gulf Coast Intellectual Property Group

(57) ABSTRACT

A motorcycle footrest that is configured to be operably coupled to a motorcycle and provide an additional footrest member for a rider to place their feet during operation of the motorcycle. The motorcycle footrest of the present invention includes a coupling member wherein the coupling member is undulated in shape having a contiguous upper portion and lower portion. The lower portion has an aperture formed therethrough and is of suitable size to accommodate a footpeg standoff therethrough. The coupling member includes an offset member contiguous therewith. A first arm support member is rotatably secured to the offset member and includes a first end and second end. A second arm support member is secured to the second end of the first arm support member. A footrest member is secured to the second end of the second support arm member.

5 Claims, 3 Drawing Sheets

MOTORCYCLE FOOTREST

FIELD OF INVENTION

The present invention relates generally to motorcycle accessories more specifically but not by way of limitation a dual position motorcycle footrest for the operator thereof wherein the dual position foot rest provide a first position and a second position for the operator's feet.

BACKGROUND

Whether for pleasure or for necessary transportation millions of individuals regularly ride motorcycles. Motorcycles provide a fuel efficient means of transportation and further provide to some a tactile driving experience wherein the operator is more immersed in their environment as compared to operating an automobile. It is well known in the art that there are numerous types of motorcycles available ranging from styles such as but not limited to café racers and cruisers. These motorcycles typically offer seating for one or two riders and for each rider a pair of opposing foot pegs are provided for the rider to engage during riding. Conventional foot pegs are placed such that the operator and rider will often have their legs in a generally ninety degree orientation wherein the lower leg (calf) extends upward from the foot rest and the upper leg (thigh) is generally perpendicular thereto. This is the conventional leg position for the operator for most styles of motorcycles.

One issue with the aforementioned conventional leg position is the ability for an operator to maintain a comfortable position for longer rides. As with sitting in a chair for extended periods of time, when an operator maintains the conventional leg position symptoms such as but not limited to cramps or muscle soreness can occur. Some styles of motorcycles have provided either as an accessory or standard and forward engine from that incorporates additional foot rests. These frames however are primarily designed to provide engine protection in the event the motorcycle is laid down on its side. As a result of its intended design, these frames are undesirable for many different styles of motorcycles due to their bulky appearance.

Accordingly, there is a need for a motorcycle foot rest that is operable to provide a first foot position and a second foot position wherein the motorcycle foot rest of the present invention is configured to operably engage an existing standoff or support for the original footrest.

SUMMARY OF THE INVENTION

It is the object of the present invention to provide a motorcycle foot rest that is configured to provide a first foot position and a second foot position for the operator of a motorcycle wherein the motorcycle foot rest of the present invention includes a lower coupling.

Another object of the present invention is to provide a motorcycle foot rest configured to provide two supports for the operator of the motorcycle to place their feet wherein the lower coupling has a lower section and an upper section wherein the lower portion is configured with lower an aperture configured to circumferentially mount a standoff or support of the motorcycle frame.

A further object of the present invention is to provide a motorcycle foot rest that is configured to provide a first foot position and a second foot position for the operator of a motorcycle wherein the lower coupling includes an upper section that is integrally formed with the lower section and wherein the upper section is configured to receive a fastener therethrough so as to facilitate securing of the lower coupling to a portion of the motorcycle.

Still another object of the present invention is to provide a motorcycle foot rest configured to provide two foot supports for the operator of the motorcycle to place their feet that further includes an arm member wherein the arm member includes a first end and a second end.

An additional object of the present invention is to provide a motorcycle foot rest that is configured to provide a first foot position and a second foot position for the operator of a motorcycle wherein the first end of the arm member is operably coupled to the upper section of the lower coupling.

Yet a further object of the present invention is to provide a motorcycle foot rest configured to provide two foot supports for the operator of the motorcycle to place their feet wherein the arm member extends upward from the lower coupling and is positionable relative thereto.

Another object of the present invention is to provide a motorcycle foot rest that is configured to provide a first foot position and a second foot position for the operator of a motorcycle wherein the arm member is rotatably adjustable with respect to the upper section of the coupling.

An alternate object of the present invention is to provide a motorcycle footrest configured to provide two foot supports for the operator of the motorcycle to place their feet configured to provide two supports for the operator of the motorcycle to place their feet that further includes a mount secured to the second end of the arm member.

Still an additional object of the present invention is to provide a motorcycle foot rest that is configured to provide a first foot position and a second foot position for the operator of a motorcycle wherein the mount secured to the second end of the arm member is rotatable.

A further object of the present invention is to provide a motorcycle footrest configured to provide two supports for the operator of the motorcycle to place their feet that includes a second foot support secured to the mount.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
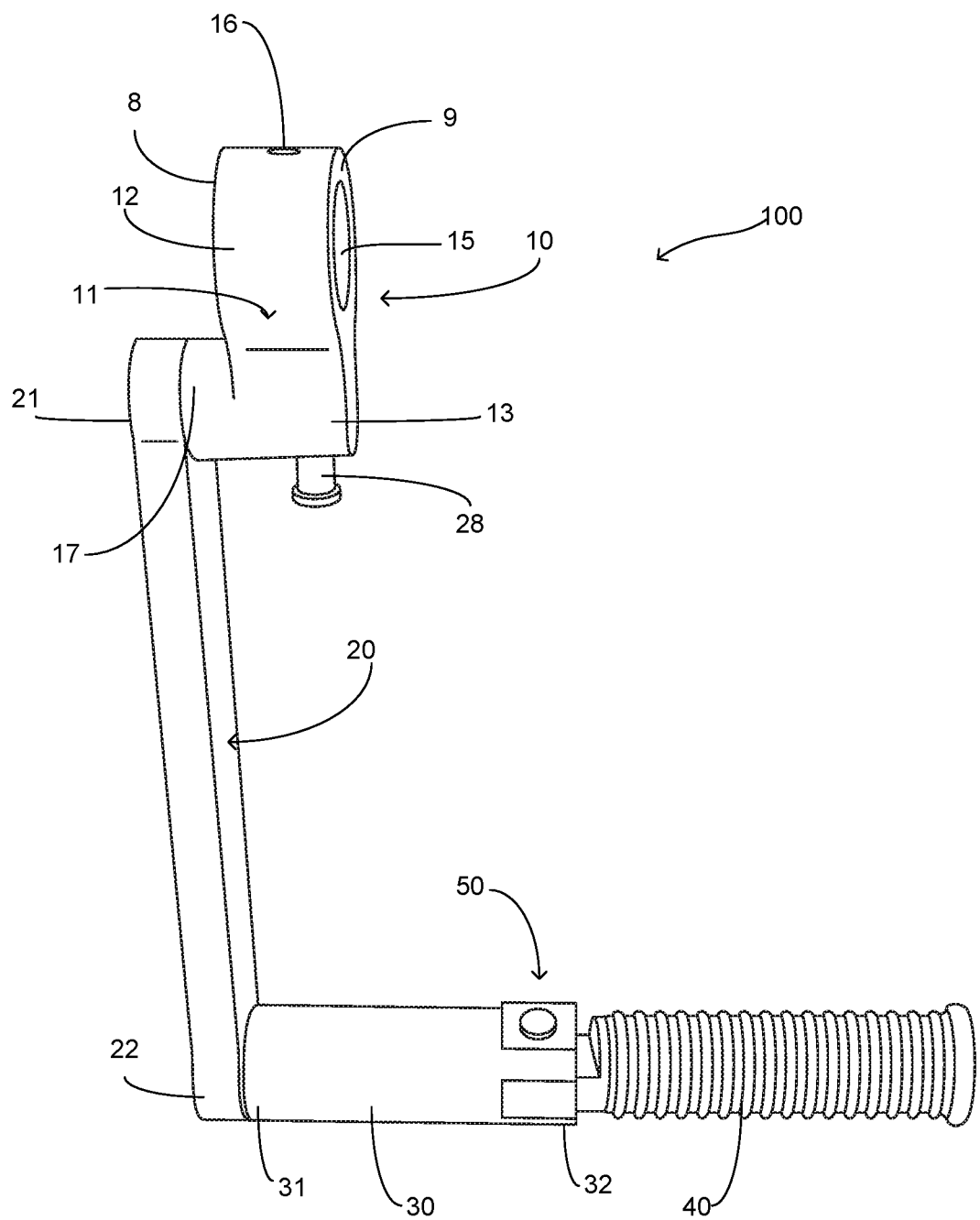
FIG. 1 is a side view of the present invention.
Figure 2:
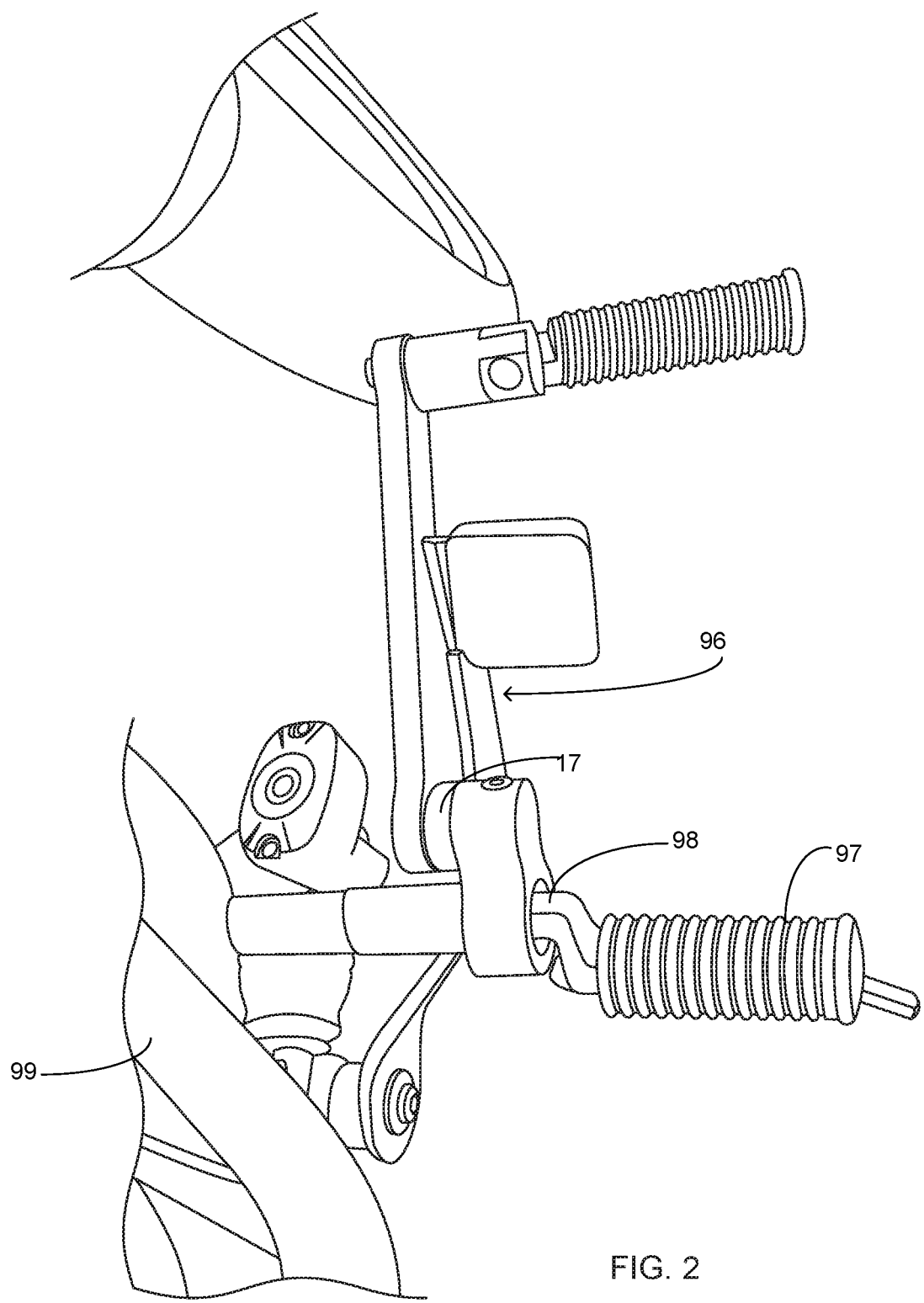
FIG. 2 is a top perspective view of the present invention coupled to a motorcycle.
Figure 3:
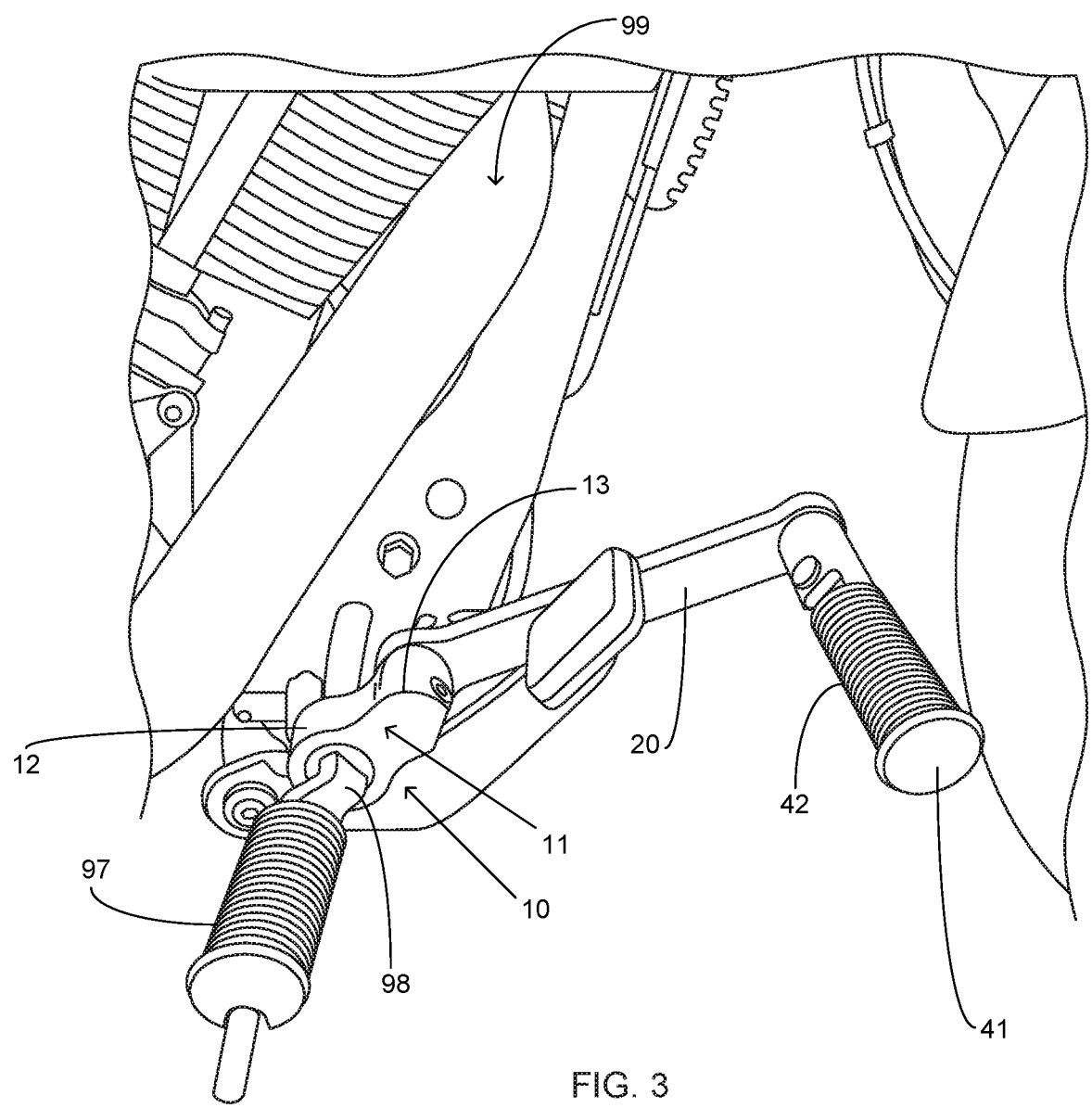
FIG. 3 is a side perspective view of the present invention coupled to a motorcycle.

Referring now to the drawings submitted herewith, wherein various elements depicted therein are not necessarily drawn to scale and wherein through the views and figures like elements are referenced with identical reference numerals, there is illustrated a motorcycle footrest 100 constructed according to the principles of the present invention.

An embodiment of the present invention is discussed herein with reference to the figures submitted herewith.

Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Now referring to the Figures submitted herewith, the motorcycle footrest 100 includes a coupling member 10, a first support arm member 20, a second support arm member 30 and a footrest member 40 configured to be releasably secured to a conventional footrest support on an exemplary motorcycle 99. The motorcycle footrest 100 is operable to adapt a conventional motorcycle foot peg and provide a first position and a second position, i.e. a first foot support and a second foot support, ensuing being operably coupled to an exemplary motorcycle in order to provide a rider thereof an optional placement for their foot.

The coupling member 10 includes a body 11 that is manufactured from a suitable durable material such as but not limited to aluminum. The body 11 includes a lower portion 12 and an upper portion 13 that are contiguously formed. The body 11 is formed in an undulated shape wherein the upper portion 13 has a width that is less than that of the lower portion 12. The undulated shape of the body 11 illustrated herein in the preferred embodiment is preferred in order to assist in mounting the body 11 to various styles of motorcycles wherein the lesser width of the upper portion 13 of the body 11 reduces interference with portions of the frame or other elements found on many exemplary motorcycles. While the body 11 is illustrated and discussed herein as having an undulated form that narrows from the lower portion 12 to the upper portion 13, it is contemplated within the scope of the present invention that the body 11 could be formed in alternate shapes in order to achieve the desired functionality as described herein. The lower portion 12 of the body 11 has an aperture 15 formed therethrough. The aperture 15 extends through the lower portion 12 from first side 8 to second side 9 having openings at each side. The aperture 15 is annular in shape an is manufactured of a suitable diameter so as to permit a standoff 98 of a motorcycle 99 to be journaled therethrough. The footrest member 97 of the motorcycle 99 is removed from the standoff 98 so as to facilitate the mounting of the motorcycle footrest 100 and ensuingly the footrest member 97 is reattached to the standoff 98. While the aperture 15 is annular in shape in the drawings submitted herewith, it is contemplated within the scope of the present invention that the aperture 15 could be formed in alternate sizes and shapes in order to achieve the desired objective discussed herein.

The body 11 is secured to the standoff 98 utilizing fastener 16. It is contemplated within the scope of the present invention that fastener 16 could be embodied utilizing various mechanical fasteners such as but not limited to screws. The fastener 16 is journaled through the lower portion 12 of the body 11 through a passage (not particularly illustrated herein) wherein an end of the fastener 16 engages the standoff 98 and biases thereagainst in order to secure the coupling member 10 in position. While a single fastener 16 has been illustrated herein, it is contemplated within the scope of the present invention that more than one fastener 16 could be utilized and further the fastener 16 could be embodied utilizing alternate mechanical elements.

The upper portion 13 has contiguously formed therewith an offset member 17. The offset member 17 is contiguously formed utilizing suitable techniques and is present in order to inhibit interference of the first support arm member 20 and brake pedal assembly 96. It is contemplated within the scope of the present invention that the offset member 17 could be manufactured in alternate lengths in order to achieve the desired objective of ensuring no interference with the first support arm member 20 and existing components of the motorcycle 99 such as but not limited to the brake pedal assembly.

The first support arm member 20 includes a first end 21, a second end 22 and is manufactured from a rigid lightweight material such as but not limited to aluminum. The first arm support member 20 is manufactured of a suitable length so as to position the second arm support member 30 such that the second arm support member 30 will not contact the brake pedal assembly 96. It is contemplated within the scope of the present invention that the first arm support member 20 could be manufactured in various lengths in order to achieve the desired objective stated herein. The first arm support member 20 is rotatably secured to the coupling member 10 utilizing fastener 28. The first support arm member 20 is movably mounted to the coupling member 10 in order to provide alternate positions for the footrest member 40 in order to accommodate different rider preferences. It should be understood within the scope of the present invention that the first arm support member 20 could be movably secured utilizing various alternate mechanical techniques.

The second arm support member 30 is secured to the second end 22 of the first arm support member 20 utilizing suitable durable techniques such as but not limited to mechanical fasteners or welding. The second arm support member 30 is manufactured from a rigid lightweight material such as but not limited to aluminum and is perpendicular in orientation to the first arm support member 20. The second arm support member 30 includes a first end 31 and second end 32.

Pivotally secured to the second end 32 of the second arm support member 30 is the footrest member 40. The footrest member 40 includes support bar 41 having a covering 42 disposed thereon. The footrest member 40 is pivotally secured to the second end 32 utilizing fastener 50. Fastener 50 facilitates the ability to move the footrest member 40 between a first position and a second position. The drawings submitted herewith illustrate the footrest member 40 in its second position wherein the footrest member 40 is axially aligned with the second arm support member 30 and is suitably positioned for use by a rider to place a foot thereon. In the first position, the footrest member 40 is pivoted so as to be perpendicular with respect to the second arm support member 30. The first position of the footrest member 40 is used when the motorcycle footrest 100 is not in use by the rider of the motorcycle 99.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the present invention.

What is claimed is:

1. A motorcycle footrest configured to be secured to a motorcycle comprising:

a coupling member, said coupling member having a body, said body of said coupling member having an aperture journaled therethrough, said aperture of said body configured to have a motorcycle footpeg standoff journaled therethrough, wherein said body of said coupling member includes a lower portion and an upper portion, said lower portion and said upper portion being contiguous, said lower portion having a width that is greater than a width of the upper portion;

a first arm support member, said first arm support member being movably coupled to said body of said coupling member, said first arm support member having a first end and a second end, said first end of said support arm member being movably coupled to said body;

a second arm support member, said second arm support member being coupled to said second end of said first arm support member, said second arm support member having a first end and a second end, said second arm support member being perpendicular to said first arm support member;

an offset member, said offset member being contiguous with said body of said coupling member, said offset member being intermediate said body and said first end of said first arm support member, wherein said first arm support member is rotatably positionable to said offset member;

a footrest member, said footrest member being operably secured to said second end of said second arm support member, said footrest member being movable between a first position and a second position, wherein in said first position said footrest member is perpendicular to said second arm support member and wherein in said second position said footrest member is in axial alignment with said second arm support member.

2. A motorcycle footrest that is configured to be secured to a motorcycle and provide an additional location for a motorcycle rider to place their feet wherein the motorcycle footrest comprises:

a coupling member, said coupling member having a body, said body having a first side and a second side, said body of said coupling member having a lower portion and an upper portion, said lower portion and said upper portion being contiguous, said body being undulated in shape wherein said lower portion of said body has a width greater that a width of said upper portion, said lower portion of said body of said coupling member having an aperture journaled therethrough, said aperture of said body configured to have a motorcycle footpeg standoff journaled therethrough, said body further having an offset member being contiguously formed with said upper portion of said body, said offset member extending outward from said first side of said body, said offset member being perpendicular to said body;

a first arm support member, said first arm support member being movably coupled to said offset member, said first arm support member having a first end and a second end, said first end of said support arm member being movably coupled to said offset member;

a second arm support member, said second arm support member being coupled to said second end of said first arm support member, said second arm support member being perpendicular to said first arm support member;

a footrest member, said footrest member being operably secured to said second end of said second arm support member, said footrest member being movable between a first position and a second position.

3. The motorcycle footrest as recited in claim 2, wherein in said first position said footrest member is perpendicular to said second arm support member.

4. The motorcycle footrest as recited in claim 3, wherein in said second position said footrest member is in axial alignment with said second arm support member.

5. The motorcycle footrest as recited in claim 4, wherein said first arm support member is rotatably positionable with respect to said offset member.

* * * * *